(12) United States Patent
Filipiak

(10) Patent No.: US 8,167,346 B2
(45) Date of Patent: May 1, 2012

(54) HIGH SPEED GRIPPER

(75) Inventor: Michael A. Filipiak, Ann Arbor, MI (US)

(73) Assignee: Norgren Automation Solutions, LLC, Clinton Township, MI (US)

( * ) Notice: Subject to any disclaimer, the term of this patent is extended or adjusted under 35 U.S.C. 154(b) by 605 days.

(21) Appl. No.: 12/250,159

(22) Filed: Oct. 13, 2008

(65) Prior Publication Data

US 2010/0090484 A1 Apr. 15, 2010

(51) Int. Cl.
*B25J 15/02* (2006.01)
(52) U.S. Cl. ........................................................ 294/192
(58) Field of Classification Search .................. 294/88, 294/116, 907; 251/62, 129.15
See application file for complete search history.

(56) References Cited

U.S. PATENT DOCUMENTS

| | | | | |
|---|---|---|---|---|
| 3,851,769 A * | 12/1974 | Noguchi et al. | ........... | 414/744.3 |
| 4,348,044 A * | 9/1982 | Wood, III | ........................ | 294/88 |
| 4,448,393 A * | 5/1984 | Habegger et al. | ............. | 254/264 |
| 4,784,042 A * | 11/1988 | Paynter | ........................... | 91/534 |
| 4,883,939 A * | 11/1989 | Sagi | ............................ | 219/125.1 |
| 5,649,745 A | 7/1997 | Anderson | | |
| 5,672,044 A * | 9/1997 | Lemelson | .................. | 414/744.3 |
| 6,004,215 A * | 12/1999 | Morath et al. | ................. | 470/164 |
| 6,874,834 B2 | 4/2005 | McIntosh | | |
| 7,695,071 B2 * | 4/2010 | Jackson et al. | ................ | 299/1.05 |
| 2007/0012366 A1 * | 1/2007 | Charlton et al. | ............... | 137/553 |

* cited by examiner

*Primary Examiner* — Saul Rodriguez
*Assistant Examiner* — Stephen Vu
(74) *Attorney, Agent, or Firm* — Young Basile Hanlon & MacFarlane P.C.

(57) ABSTRACT

A gripper assembly includes at least one gripper jaw, a fluid driven actuator for moving the at least one gripper jaw, and a valve located adjacent the fluid driven actuator for selectively delivering a fluid to the fluid driven actuator.

19 Claims, 5 Drawing Sheets

HIGH SPEED GRIPPER

BACKGROUND OF THE INVENTION

This disclosure generally relates to automated handling equipment and, more particularly, to an actuated gripper assembly and system.

Automated handling equipment is typically employed in industrial settings for transferring work pieces between work stations. Typically, the equipment includes one or more grippers that clamp onto the work pieces while moving them between stations.

One type of conventional gripper includes a pneumatic actuator that moves a pair of gripper jaws between open and closed positions. For example, the pneumatic actuator includes a piston within a chamber, a piston rod coupled for movement with the piston, and an air supply port on each side of the piston. The piston rod is coupled with the gripper jaws. An air source delivers pressurized air through one of the ports to move the piston in one direction to open the gripper jaws and through the other port to move the piston in an opposite direction to close the gripper jaws, for example.

Typically, a network of air lines connects a series of grippers with a central air source that is located remotely from the grippers. The network of air lines includes a first set of air lines connecting one of the ports of each gripper to the air source and a second set of air lines connecting the other port of each gripper to the air source. A central controller controls a valve system located at the air source to deliver pressurized air through the first set of air lines to open the grippers or through the second set of air lines to close the grippers.

Although such conventional gripper systems are effective, there is opportunity for improving the system with regard to gripper operation speed. For example, there is a considerable amount of time between the central controller switching the valve system and movement of the gripper jaws. One reason for this is that there is a considerable length and volume of air lines that the remote central air source must pressurize before the air pressure at the grippers reaches a level that actuates the grippers. Thus, there is a considerable reaction time between switching the valve system and movement of the grippers.

SUMMARY OF THE INVENTION

An example gripper assembly includes at least one gripper jaw, a fluid-driven actuator for moving the at least one gripper jaw, and a valve located adjacent the fluid driven actuator for selectively delivering a fluid to the fluid driven actuator. For example, the valve is an electronically controlled solenoid connected with a central controller for selectively actuating the fluid-driven actuator.

In one example, the one or more gripper jaws are movable between an open position and a closed position in response to an electronic actuation signal from the central controller. The gripper includes a reaction time between the electronic actuation signal and movement of the one or more gripper jaws between the open and the closed position. For example, the reaction time is less than about 100 milliseconds. The gripper also includes a reflex time between the electronic actuation signal and an initial movement of the one or more gripper jaws that is less than about 40 milliseconds.

One example gripper system includes a plurality of the grippers as described above. The respective valves of the grippers are connected to a central controller that electronically controls the valves to selectively deliver pressurized fluid to the fluid-driven actuators of the grippers.

These and other features of the present invention can be best understood from the following specification and drawings, the following of which is a brief description.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
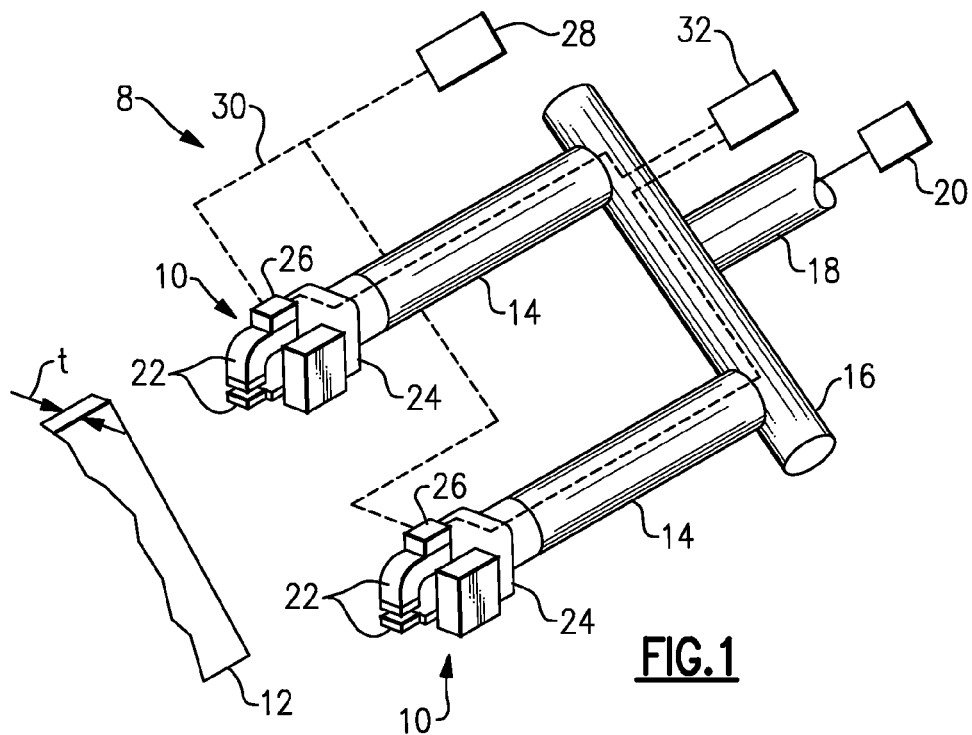
FIG. 1 illustrates selected portions of an example gripper system having a plurality of gripper assemblies.

FIG. 1 illustrates selected portions of a gripper system 8 having a plurality of gripper assemblies 10 used in an example industrial setting to grip and move a work piece 12 (shown schematically). The gripper assemblies 10 may be used in a variety of different configurations and different settings from that shown. In the illustrated example, the gripper assemblies 10 are coupled to extended arms 14, which are each secured to a rail 16. An adapter arm 18 is secured to the rail 16. An automated machine 20, such as a robot, moves the adapter arm 18, the extended arms 14, and the gripper assemblies 10 to desired positions to retrieve and deposit the work pieces 12, such as between work stations.

As shown, each of the gripper assemblies includes gripper jaws 22 that are coupled to move in response to actuation of a respective actuator 24. Each of the gripper assemblies 10 includes a valve 26 located adjacent the respective actuator 24. Each of the valves 26 is connected to a pressurized air source 28 via air supply lines 30. A central controller 32 is electrically connected with each of the valves 26 and selectively operates the valves 26 to deliver pressurized air into the actuators 24 to simultaneously operate the gripper assemblies 10.

Figure 2:
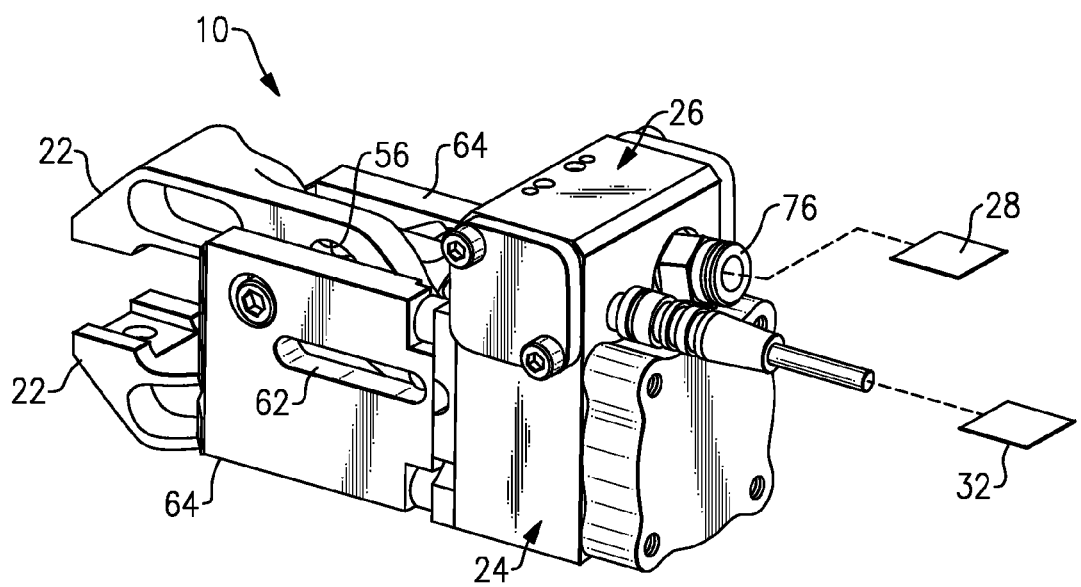
FIG. 2 illustrates an example gripper assembly.
Figure 3:
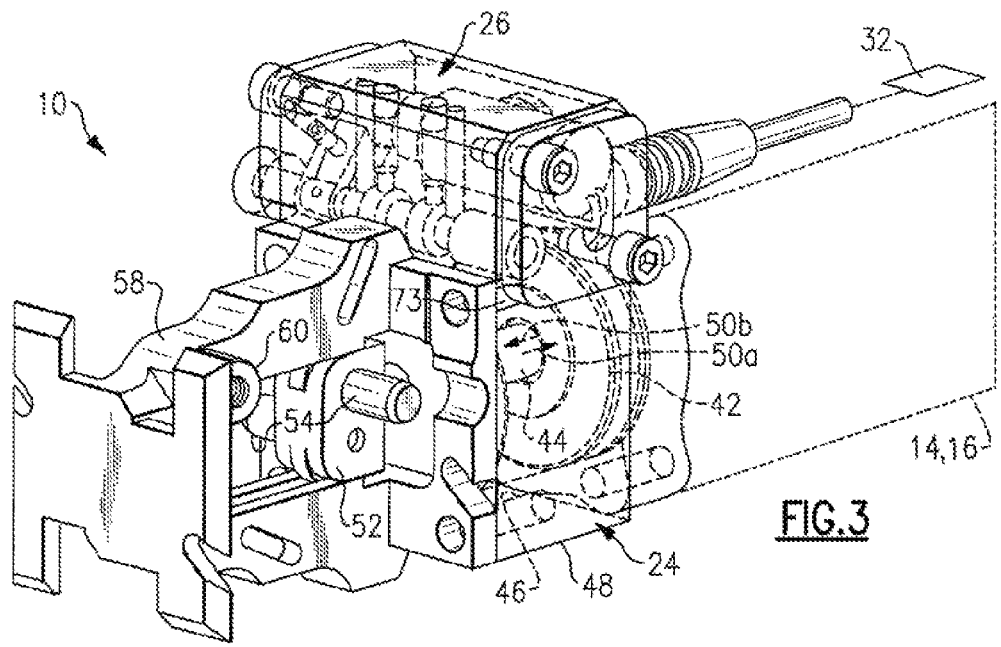
FIG. 3 illustrates selected portions of the example gripper assembly.

FIGS. 2 and 3 illustrate one example gripper assembly 10. In this example, the actuator 24 is a pneumatic actuator having a piston 42 coupled with a piston rod 44. Other types of fluid-driven actuators are also contemplated. The piston 42 and piston rod 44 are linearly movable within a bore 46 formed in a housing 48. The piston 42 separates the bore 46 into two chambers, a retraction chamber (forward of the piston 42 in FIG. 3) and an extension chamber (in back of the piston 42 in FIG. 3). The valve 26 selectively supplies pressurized air to the retraction chamber to retract the piston 42 and piston rod 44 in direction 50a or to the extension chamber to extend the piston 42 and piston rod 44 in direction 50b.

Reciprocating movement of the piston rod 44 in the directions 50a and 50b moves a cam head 52 that is coupled to an end of the piston rod 44. Cam pins 54 that extend from the cam head 52 are received within cam slots 56 of the respective gripper jaws 22. As the cam head 52 reciprocates along the support 58, the gripper jaws 22 pivot about pivots 60 (e.g., pivot bosses) that extend from the support 58. The cam pins 54 extend through the cam slots 56 of the gripper jaws 22 into corresponding guide slots 62 within respective side covers 64 of the gripper assembly 10. Given this description, one of ordinary skill in the art will recognize that the disclosed examples may also be applied to other gripper architectures.

In the illustrated example, the valve 26 is located directly adjacent the actuator 24. In this example, the valve 26 and the actuator 24 are formed within the housing 48 such that the valve 26 and the actuator 24 share a common wall 73 there between. For example, the housing 48 is formed from a single, monolithic piece of metal, such as by machining a block of metal, casting, or other forming process to form the bore 46 and the various chambers of the valve 26 with the common wall 73 there between. Alternatively, the valve 26 may be a separate piece that is attached to the actuator 24 such that the housing 48 includes two or more separate pieces that form the bore 46 and the various chambers of the valve 26. The valve may also be a separate piece that are located near the actuator 24 such that there is relatively small distance of air supply line 30 between the valve 26 and the actuator 24. For instance, the distance may be a few feet or a few inches to reduce the length of air supply line 30 that must be pressurized.

Figure 4:
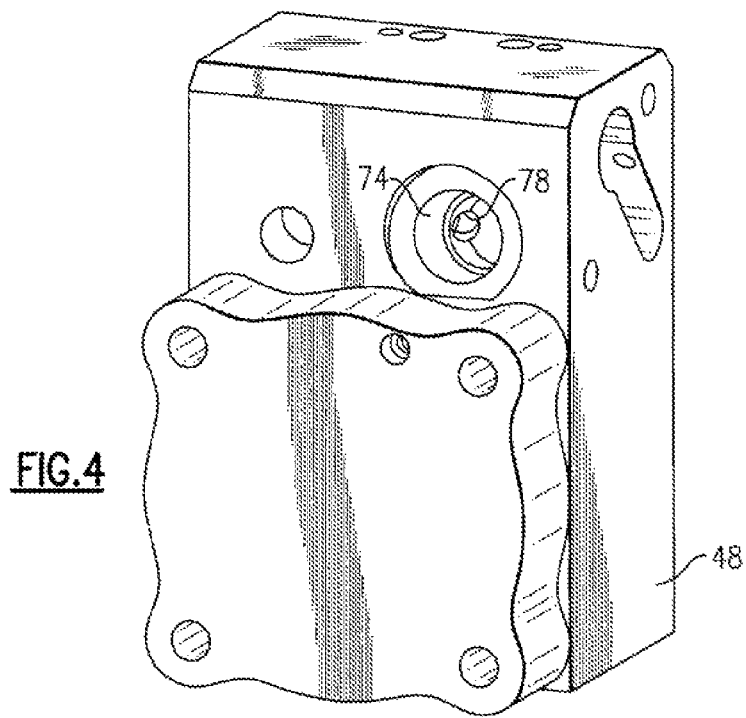
FIG. 4 illustrates a first view of an example housing of a valve and actuator of the gripper assembly without the moving parts of the valve and the actuator.
Figure 5:
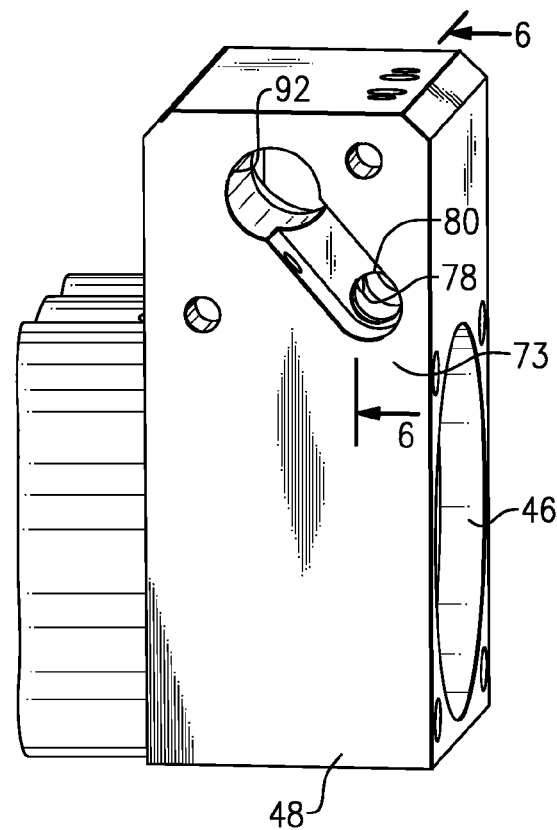
FIG. 5 illustrates a second view of the example housing without the moving parts of the valve and the actuator.
Figure 6:
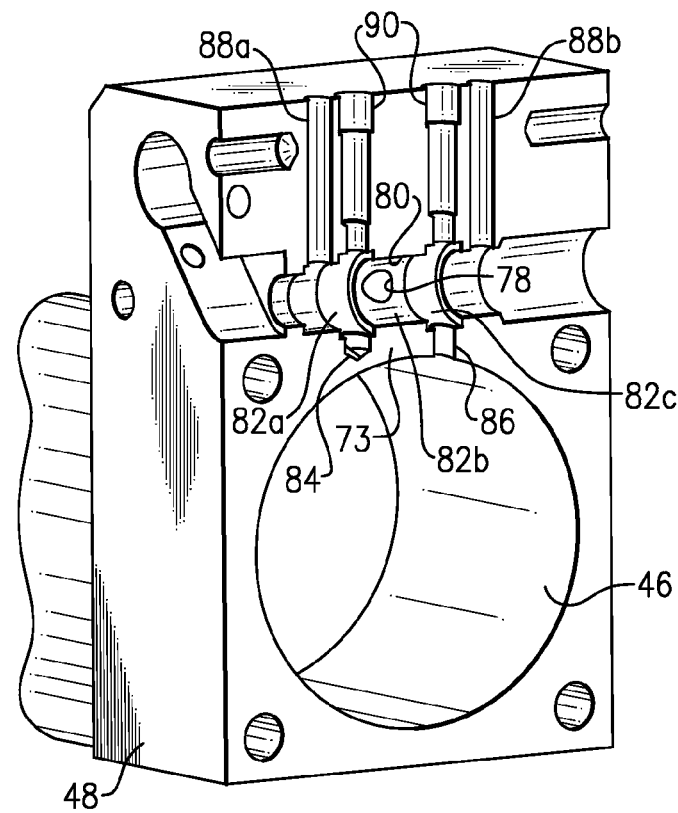
FIG. 6 illustrates a sectional view of the example housing without the moving parts of the valve and the actuator.

Referring to FIGS. 4-6, the housing 48 is illustrated without the moving parts of the actuator 24 and the valve 26. In this example, the housing 48 includes an air inlet bore 74 for receiving an air inlet fitting 76 (FIG. 2) that connects the valve 26 with the air supply line 30. A connection bore 78 extends from the air inlet bore 74 to a valve chamber 80. In the illustrated example, the valve chamber 80 is generally cylindrical and includes sections 82a, 82b, and 82c that vary in diameter. Section 82a connects with an extension port 84 that extends rearward (FIG. 6) to connect the extension chamber of the bore 46 with the valve chamber 80. Thus, air flowing through the extension port 84 pressurizes the extension chamber of the actuator 24.

Section 82c connects with a retraction port 86 that connects the valve chamber 80 with the retraction chamber of the bore 46. Thus, air flowing through the retraction port 86 pressurizes the retraction chamber of the actuator 24.

A first exhaust port 88a fluidly connects the extension port 84 with the surrounding atmosphere of the gripper assembly 10 by way of the section 82a of the valve chamber 80. Likewise, another exhaust port 88b fluidly connects the retraction port 86 by way of section 82c of the valve chamber 80 with the surrounding atmosphere.

In this example, the housing 48 also includes two additional bores 90, formed for manufacturing purposes, which do not function in the operation of the valve 26. The bores 90 are plugged with seals 91. Depending on the manufacturing process, the housing 48 may not include the bores 90 and seals 91 in some examples.

The housing 48 includes a solenoid bore 92 adjacent the valve chamber 80 for accommodating a solenoid 94 (FIG. 7) to operate the valve 26.

Figure 7:
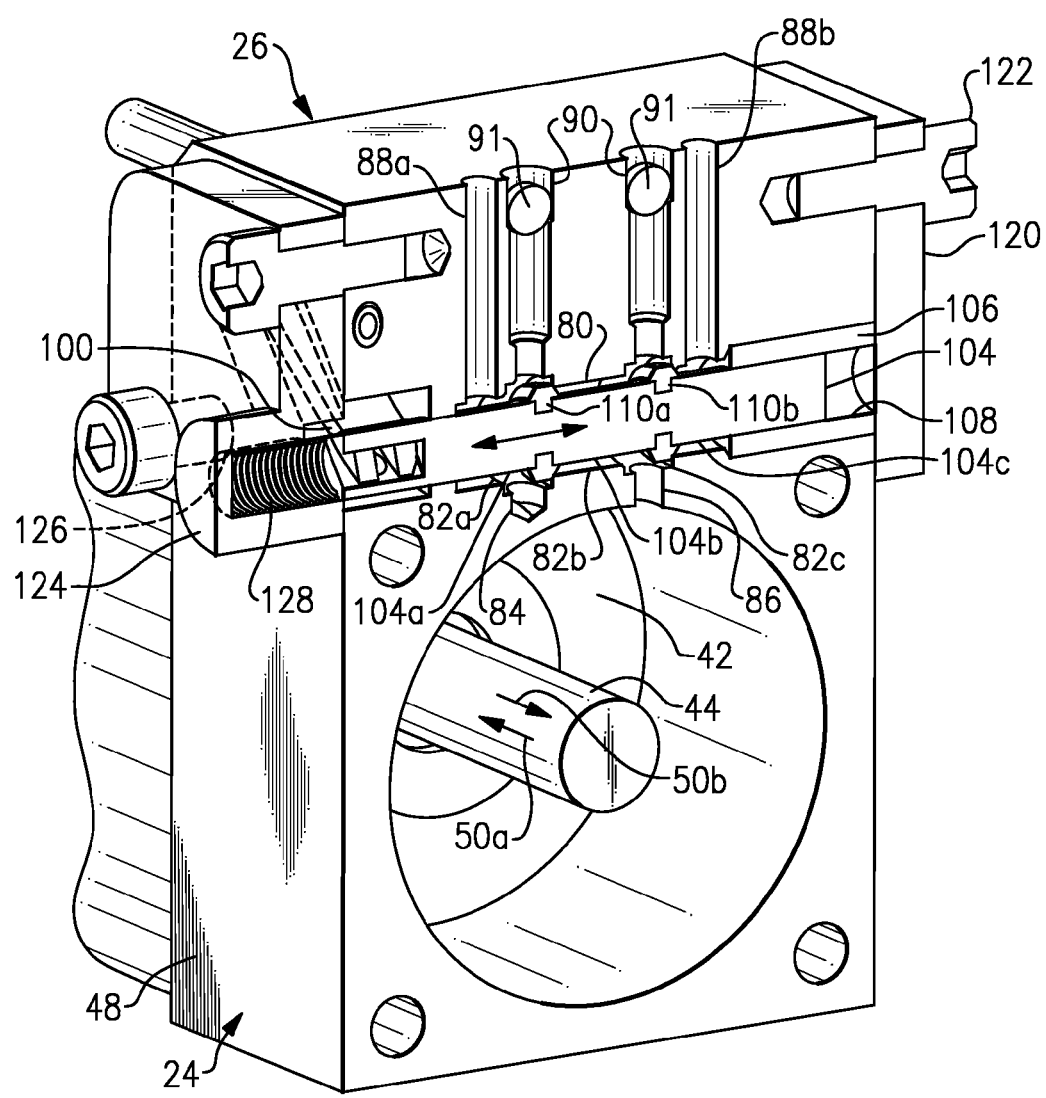
FIG. 7 illustrates a sectional view of the valve and the actuator.
Figure 8:
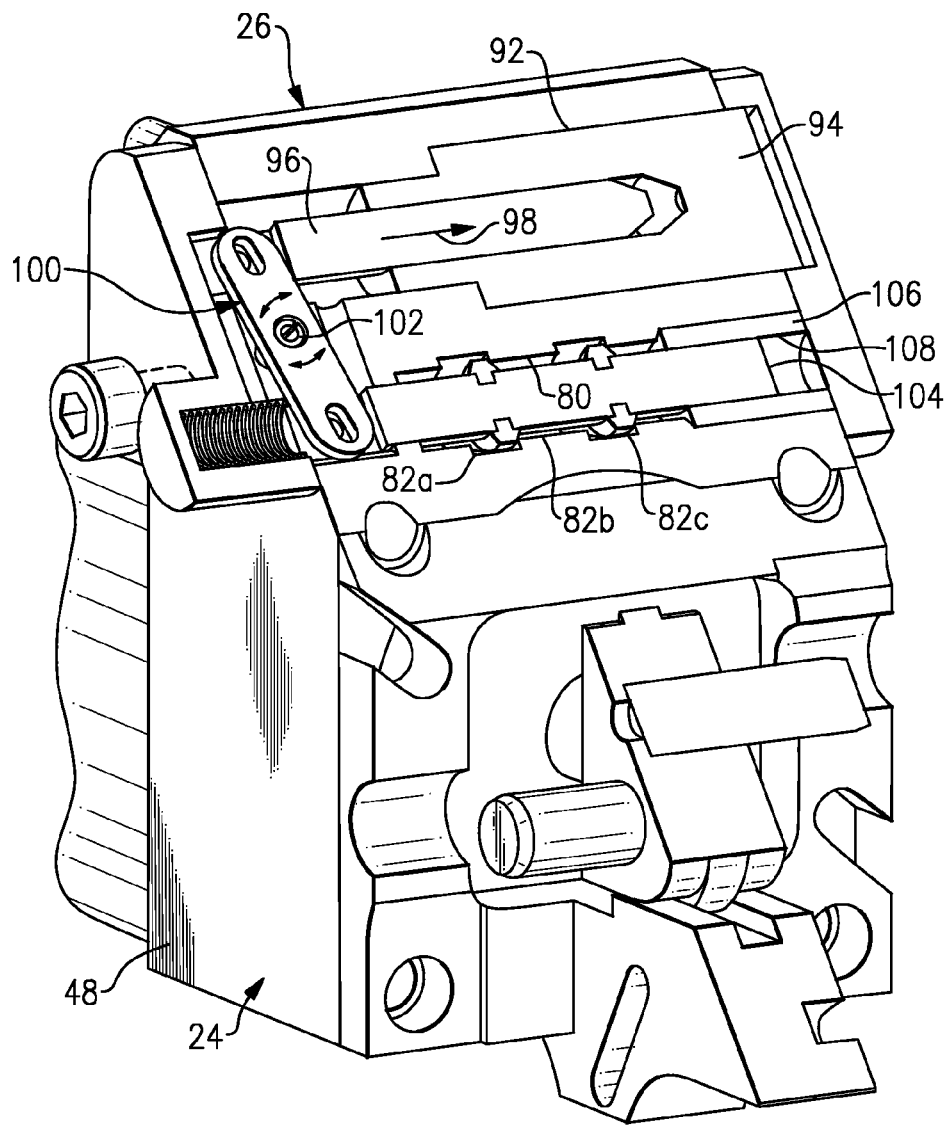
FIG. 8 illustrates another sectional view of the valve and the actuator.

FIGS. 7 and 8 illustrate several sections through the actuator 24 and the valve 26 with the moving parts now illustrated. In this example, the solenoid 94 includes a solenoid rod 96 that the solenoid 94 selectively moves in direction 98. An end of the solenoid rod 96 is coupled with a pivot member 100. The pivot member 100 is rotatably connected with a pivot pin 102. At one end, the pivot member 100 is connected with the solenoid rod 96, and at the other end, the pivot member 100 is coupled with a valve spool 104.

The valve spool 104 is located within the valve chamber 80. A guide sleeve 106 adjacent the valve chamber 80 includes an opening 108 that receives an end of the valve spool 104. The opening 108 provides a bearing surface and permits the valve spool 104 to slide linearly along the opening 108. The guide sleeve 106 thereby provides the benefit of maintaining alignment and orientation of the valve spool 104 within the valve chamber 80.

In this example, the valve spool 104 is generally cylindrical and includes sections 104a, 104b, and 104c that correspond, respectively, to the sections 82a, 82b, and 82c of the valve chamber 80. A first seal 110a is secured on the valve spool 104 between the sections 104a and 104b. A second seal 110b is spaced apart from the seal 110a and is located between sections 104b and 104c.

A cap 120 is secured to the housing 48 using one or more fasteners 122 to hold the solenoid 94 and the guide sleeve 106 in place. The cap 120 is removable to allow replacement or refurbishment of the guide sleeve 106 or solenoid 94 as needed.

Another cap 124 on the other side of the housing 48 includes an internal bore 126 that contains a bias member 128, such as a spring. When secured to the housing 48, the cap 124 compresses the bias member 128 such that the bias member 128 biases the valve spool 104 to the right in FIGS. 7 and 8. The bias member 128 thereby provides the benefit of biasing the valve spool 104 toward a desired default position. Alternatively, the bias member 128 could be located on the other end of the valve spool 104 to bias the valve spool 104 to the left in FIGS. 7 and 8, thereby providing a different default position.

In operation, each solenoid 94 of each of the gripper assemblies 10 is electrically connected with the central controller 32. To simultaneously actuate the gripper assemblies 10, the central controller 32 transmits an electronic actuation signal to each of the solenoids 94. In response, the solenoids 94 retract their respective solenoid rods 96 in direction 98 to pivot the corresponding pivot members 100 about the pivot pins 102. In the example illustrated in FIG. 8, the pivot member 100 rotates clockwise about the pivot pin 102 and moves the valve spool 104 against the biasing force of the bias member 128. In this regard, the pivot member 100 functions as a lever to actuate the valve spool 104. In absence of the electronic actuation signal, the solenoids 94 relax, and the bias members 128 move the valve spools 104 back to the default position.

In the default position illustrated in FIG. 8, the retraction chamber is fluidly connected with the air supply line 30 through the retraction port 86, section 82b of the valve chamber 80, connection bore 78, and the air inlet bore 74. In the default position, the extension chamber is vented to the surroundings by way of connection between the extension port 84, section 82a of the valve chamber 80, and the exhaust port 88a. Pressurization of the retraction chamber moves the piston 42 and piston rod 44 in direction 50a to close the gripper jaws 22, for example.

Activation of the solenoid 94 moves the valve spool 104 against the biasing force of the bias member 128 (to the left in FIG. 7), which depressurizes the retraction chamber and pressurizes the extension chamber to open the gripper jaws 22, for example. Movement of the valve spool 104 to the left from the illustrated default position moves the seal 110b against the wall formed between section 82b and section 82c of the valve chamber 80 to prevent pressurized air from flowing to the retraction port 86. Movement to the left also connects the retraction port 86 with the exhaust port 88b to vent the retraction chamber to the surroundings. As the valve spool 104 moves to the left, the seal 110a moves to the left, thereby permitting pressurized air to pressurize the extension chamber of the actuator 24 by way of the extension port 84, valve chamber 80, connection bore 78, and the air inlet bore 74. Thus, reciprocating movement of the valve spool 104 cyclically vents and pressurizes the retraction and extension chambers to move the gripper jaws 22. The above structure and operation is only an example, and alternative arrangements may be used. In one alternative, close tolerances between the valve spool 104 and the surrounding walls may provide suitable sealing and eliminate the need for seals 110a and 110b.

The arrangement of the gripper assemblies 10 and the gripper system 8 provide the benefit of high speed operation. For each gripper assembly 10, the location of the valve 26 adjacent the actuator 24 eliminates the need to pressurize considerable lengths of air line before accumulating enough pressure to actuate the actuator 24 because the air supply lines 30 in the gripper system 8 remain constantly pressurized, and the valve 26 switches the supply of pressurized air between the retraction and extension chambers. Additionally, less total length and volume of air line is needed in comparison to previous systems because each gripper assembly 10 receives air through a single air line rather than two air lines. The gripper system 8 also may consume less air than previous systems because the air supply lines 30 are constantly pressurized, whereas previous systems vent inactive air lines between gripping cycles to depressurize a portion of the actuator.

The disclosed example gripper assemblies 10 have a reaction time between receipt of the electronic actuation signal from the central controller 32 into the solenoid 94 and movement of the gripper jaws 22 between the open and closed position that is typically less than about 100 milliseconds. For example, the reaction time may be about 80 milliseconds or less. Depending upon the air pressure and arrangement of the valve 26 and actuator 24, even faster reaction times may be possible, although there may be a reflex time between receipt of the electronic actuation signal from the central controller 32 into the respective solenoid 94 and an initial movement of the gripper jaws 22 that may typically be about 40 milliseconds or less. The reaction time and reflex time may be determined experimentally or by using other suitable methods.

As can be appreciated, the fast reaction time and reflex time of the disclosed example gripper system 8 and gripper assemblies 10 may enhance a manufacturing operation by reducing waiting time and/or reducing or eliminating the need for anticipation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gripper assembly comprising:
   at least one gripper jaw that is movable between an open position and a closed position;
   a fluid-driven actuator operative for moving the at least one gripper jaw between the open position and the closed position;
   a valve adjacent the fluid-driven actuator, the valve being operable to selectively deliver a fluid to the fluid-driven actuator, wherein the valve includes a valve chamber, a valve member that is disposed within the valve chamber, and an electrically operated solenoid that mechanically actuates movement of the valve member; and the fluid-driven actuator and the valve include a common wall there between.

2. The gripper assembly as recited in claim 1, wherein the valve is fixed to the fluid-driven actuator.

3. The gripper assembly as recited in claim 1, further comprising an electronic controller connected with the valve for selectively switching the valve.

4. The gripper assembly as recited in claim 1, wherein the valve member comprises a valve spool that is moveable within the valve chamber between a first position and a second position.

5. The gripper assembly as recited in claim 1, wherein the valve includes a first port that fluidly connects the valve to the fluid-driven actuator for selectively retracting the fluid-driven actuator and a second port that fluidly connects the valve to the fluid-driven actuator for selectively extending the fluid-driven actuator.

6. The gripper assembly as recited in claim 1, further comprising:
   a housing having the valve chamber of the valve defined therein, the valve member of the valve disposed therein, and the fluid-driven actuator disposed therein.

7. A gripper assembly comprising:
   at least one gripper jaw;
   a fluid-driven actuator operative for moving the at least one gripper jaw; and
   a valve adjacent the fluid-driven actuator, the valve being operable to selectively deliver a fluid to the fluid-driven actuator, the valve including a valve chamber, a valve spool that is moveable within the valve chamber between a first position and a second position, a first port that fluidly connects the valve chamber and a gripper retraction chamber of the fluid-driven actuator when the valve spool is in the first position, a second port that fluidly connects the valve chamber and a gripper extension chamber of the fluid-driven actuator when the valve spool is in the second position, a first exhaust port that fluidly connects the valve chamber and the gripper retraction chamber of the fluid-driven actuator with an exhaust region when the valve spool is in the first position, and a second exhaust port that fluidly connects the valve chamber and the gripper extension chamber of the fluid-driven actuator with the exhaust region when the valve spool is in the second position.

8. A gripper assembly comprising:
   at least one gripper jaw;
   a fluid-driven actuator operative for moving the at least one gripper jaw; and
   a valve adjacent the fluid-driven actuator, the valve being operable to selectively deliver a fluid to the fluid-driven actuator, the valve including a valve chamber, a valve spool that is moveable within the valve chamber between a first position and a second position, and a lever having a first end that is pivotally coupled to a solenoid and a second end that is pivotally coupled to the valve spool.

9. A gripper assembly comprising:
   at least one gripper jaw;
   a fluid-driven actuator operative for moving the at least one gripper jaw;
   a valve adjacent the fluid-driven actuator, the valve being operable to selectively deliver a fluid to the fluid-driven actuator; and
   a housing having the fluid-driven actuator and the valve disposed therein, the housing including at least one port along which the fluid is selectively delivered to the fluid-driven actuator.

10. The gripper assembly as recited in claim 9, wherein the housing is a unitary housing.

11. The gripper assembly as recited in claim 9, wherein the at least one gripper jaw is movable between an open position and a closed position, and the fluid-driven actuator is operative for moving the at least one gripper jaw between the open position and the closed position.

12. The gripper assembly as recited in claim 9, wherein at least a portion of the fluid-driven actuator and at least a portion of the valve are disposed at fixed positions with respect to one another.

13. A gripper assembly comprising:
   at least one gripper jaw;
   a fluid-driven actuator operative for moving the at least one gripper jaw;
   a valve adjacent the fluid-driven actuator, the valve being operable to selectively deliver a fluid to the fluid-driven actuator; and
   a unitary housing having the valve and the fluid-driven actuator disposed therein, wherein the unitary housing defines a valve chamber of the valve, a gripper retraction chamber of the fluid-driven actuator, and a gripper extension chamber of the fluid-driven actuator.

14. The gripper assembly as recited in claim 13, wherein the at least one gripper jaw is movable between an open position and a closed position, and the fluid-driven actuator is operative for moving the at least one gripper jaw between the open position and the closed position.

15. The gripper assembly as recited in claim 13, wherein at least a portion of the fluid-driven actuator and at least a portion of the valve are disposed at fixed positions with respect to one another.

16. A gripper assembly comprising:
   at least one gripper jaw;
   a fluid-driven actuator operative for moving the at least one gripper jaw;
   a valve adjacent the fluid-driven actuator, the valve being operable to selectively deliver a fluid to the fluid-driven actuator;
   a housing having the valve and the fluid-driven actuator disposed therein; and
   a structure that is fixedly connected to the housing, the at least one gripper jaw being pivotally connected to the structure.

17. The gripper assembly as recited in claim 16, wherein the housing is a unitary housing.

18. The gripper assembly as recited in claim 16, wherein the at least one gripper jaw is movable between an open position and a closed position, and the fluid-driven actuator is operative for moving the at least one gripper jaw between the open position and the closed position.

19. The gripper assembly as recited in claim 16, wherein at least a portion of the fluid-driven actuator and at least a portion of the valve are disposed at fixed positions with respect to one another.

* * * * *